US009158559B2

(12) United States Patent
Simmons et al.

(10) Patent No.: US 9,158,559 B2
(45) Date of Patent: Oct. 13, 2015

(54) ROAMING OF NOTE-TAKING APPLICATION FEATURES

(75) Inventors: Alex J. Simmons, Seattle, WA (US); Arun Venkat Ramachandran, Redmond, WA (US); Vladilen Bessonov, Issaquah, WA (US); Patricia Walsh, Seattle, WA (US); Brad Corob, Kirkland, WA (US); Nicole Steinbok, Sammamish, WA (US); Donovan P. Lange, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 615 days.

(21) Appl. No.: 13/359,509

(22) Filed: Jan. 27, 2012

(65) Prior Publication Data

US 2013/0198257 A1 Aug. 1, 2013

(51) Int. Cl.
G06F 15/16 (2006.01)
G06F 9/445 (2006.01)
H04W 8/18 (2009.01)

(52) U.S. Cl.
CPC .......... G06F 9/44505 (2013.01); G06F 9/4451 (2013.01); H04W 8/18 (2013.01)

(58) Field of Classification Search
CPC ..... H04L 67/1095; H04L 4/003; H04L 8/245; H04L 67/12; H04W 8/183; H04W 8/18; G06F 9/45537; G06F 9/445; G06F 9/4551; G06F 9/45505
USPC .......... 709/203; 715/250, 252, 253, 864, 866; 717/178
See application file for complete search history.

(56) References Cited

U.S. PATENT DOCUMENTS

| | | | | |
|---|---|---|---|---|
| 8,271,889 | B1* | 9/2012 | Beckert et al. | 715/762 |
| 2006/0090127 | A1 | 4/2006 | Silverbrook et al. | |
| 2007/0004393 | A1* | 1/2007 | Forsberg et al. | 455/420 |
| 2009/0319910 | A1* | 12/2009 | Escapa et al. | 715/751 |
| 2010/0191772 | A1 | 7/2010 | Brown et al. | |
| 2010/0191807 | A1* | 7/2010 | Brown et al. | 709/204 |
| 2011/0153781 | A1* | 6/2011 | Srinivas et al. | 709/219 |
| 2011/0179203 | A1* | 7/2011 | Galloway et al. | 710/74 |
| 2011/0202864 | A1 | 8/2011 | Hirsch et al. | |
| 2011/0252309 | A1 | 10/2011 | Simmons et al. | |
| 2013/0007629 | A1* | 1/2013 | Dani et al. | 715/744 |
| 2013/0080913 | A1* | 3/2013 | Rodrig et al. | 715/751 |
| 2013/0191335 | A1* | 7/2013 | Tse et al. | 707/634 |
| 2013/0318518 | A1* | 11/2013 | Paalanen et al. | 717/171 |
| 2014/0136640 | A1* | 5/2014 | Shih et al. | 709/206 |
| 2014/0304714 | A1* | 10/2014 | Shapiro | 719/318 |

OTHER PUBLICATIONS

Notice of Transmittal of the International Search Report and the Written Opinion of the International Searching Authority, or the Declaration dated Apr. 25, 2013 for PCT/US2013/022610, 14 pgs.
"Supplementary Search Report Issued in European Patent Application No. 13740924.9", Mailed Date: Jul. 21, 2015, 12 Pages.

* cited by examiner

Primary Examiner — Larry Donaghue
(74) Attorney, Agent, or Firm — Jessica Meyers; Jim Ross; Micky Minhas

(57) ABSTRACT

Methods are disclosed for managing configuration variables and settings within a note-taking application such that application features are adjusted globally across an entire note-taking application regardless of the particular device from which application content is accessed. The configuration variables and settings may pertain to any or all of a variety of application features such as but not limited to adjustment of client, user and content-specific configuration options.

20 Claims, 10 Drawing Sheets

ROAMING OF NOTE-TAKING APPLICATION FEATURES

BACKGROUND

Content for a note-taking application can be stored in a centralized server that is made remotely accessible to a plurality of client computing devices. This enables an application architecture that is at least somewhat device independent in that users may be provided an opportunity to access the content from any of a variety of different computer devices (mobile phones, tablets, laptops, PC's, etc). Storing the content centrally enables an elimination or reduction of content discrepancies across multiple devices implementing the same note-taking application.

Unfortunately, some of the advantages gained by centralizing the application content may be offset by several inconveniences and technical challenges. For example, inconsistencies may arise when user-impacted variables and settings representing application configuration options are not accounted for from one device to another when the same application content is accessed. Such inconsistency is likely to negatively impact the quality of the user experience. Also, it may not be desirable to store certain configuration options in the centralized application content because they are user specific data that is ideally treated somewhat confidentially instead of shared with all users who have access to the content.

SUMMARY

Certain embodiments of the present invention pertain to managing configuration variables and settings within a note-taking application such that configuration options are adjusted globally across an entire note-taking application regardless of the particular device from which application content is accessed. The configuration variables and settings may pertain to any or all of a variety of application features such as but not limited to adjustment of client, user and content-specific configuration options.

DETAILED DESCRIPTION OF ILLUSTRATIVE EMBODIMENTS

Figure 1:
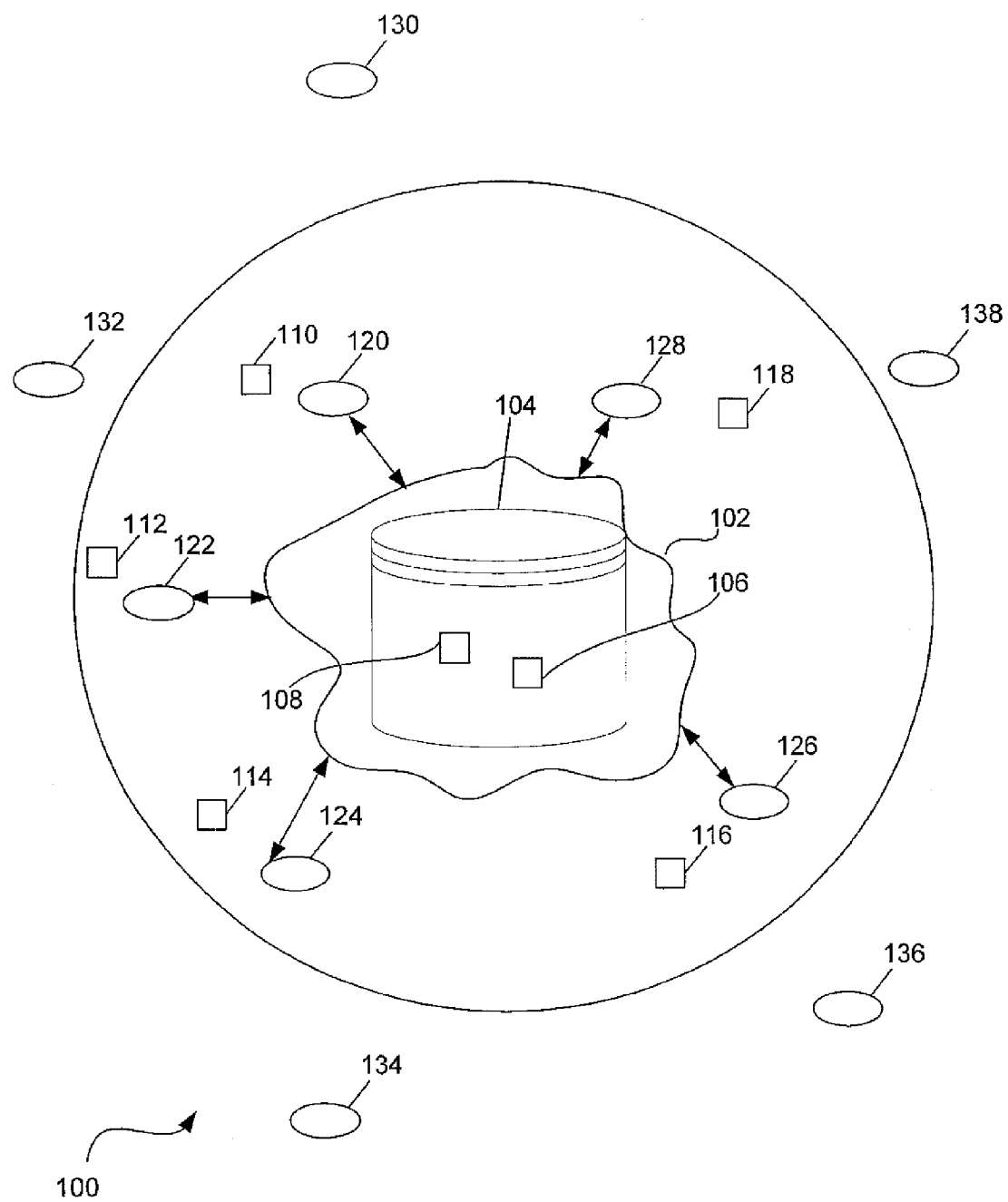
FIG. 1 is a schematic diagram of a note-taking application architecture.

FIG. 1 is a schematic diagram of exemplary note-taking application architecture 100. A plurality of application users 110, 112, 114, 116 and 118 operate a plurality of corresponding computing devices 120, 122, 124, 126 and 128, respectively. These users each also have an alternate computing device available to them. The alternate devices are labeled 130, 132, 134, 136 and 138 (which correspond to users 110-118, respectively).

Each user illustratively operates a note-taking application by way of interactions with their device and/or alternate device. The devices and alternate devices shown in FIG. 1 may be any of a wide variety of computing devices including, but not limited to, laptop computers, personal digital assistants, mobile phones, pad computers, personal computers, e-reader devices, multi-touch input/output panels, etc. When the users 110-118 utilize one of their computing devices to interact with the note-taking application, part of this interaction illustratively involves storage and retrieval of application content relative to a "cloud-based" server 104. Server 104 is shown in FIG. 1 within a cloud 102. Those skilled in the art will appreciate that this signifies that server 104 is stored on a network server remotely accessed by any or all of devices 120-138 in accordance with user-initiated commands.

The details of the network implementation of the note-taking application are not necessarily critical to the present invention. In one embodiment, the note-taking application includes application components that run at least partially from the devices 120-138. However, it is also within the scope of the present invention for the application to be partially, primarily or completely operable from a network location, for example, from within cloud 102. In this case, devices 120-138 may include a separate application such as a network browser application for facilitating interaction with the note-taking application. Any combination of remote or client-based distribution of functions or components of the note-taking application should be considered within the scope of the present invention.

Regardless of the particular distribution of the note-taking application functionality, it is consistent with one embodiment of the present invention for a collection of content data 106 to be stored within database 104, which is made accessible by way of network architecture 102 (e.g., the Internet or "the cloud"). The note-taking application is illustratively a free-form information gathering and multi-user collaboration platform that enables the users 110-118 to store notes, drawings, screen clippings, audio, video and any other item of content as part of content 106. Access to the content is selectively shared among the users based on certain preferences and system settings. When one or more of users 110-118 desire to share all or parts of their own content 106 with other of the users, functions are included within the note-taking application to enable them to adjust system parameters to share or not share with others as they see fit.

In one embodiment, the note-taking application differs from a traditional word processing application at least in that it supports more flexible user collaboration and is more free-form in terms of how and where the user is allowed to submit content into the application user interfaces. Further, in one embodiment, users of the note-taking application generally are not required to issue a save order or command because the note-taking application automatically saves the data, for example as it is entered. Still further, in one embodiment, the note-taking application is configured to convenient assist in the user-initiated organization of content into what is essentially an electronic manifestation of a notebook-style (e.g., tabbed) organization system. Users of the application are provided with function that enable them to selectively tab, re-tab, re-organize, add content to, subtract content from, and otherwise manipulate content stored within electronic notebooks.

In one embodiment, the note-taking application supports off-line, user-driven editing and then later synchronization of the edits with the information stored within database 104. In another embodiment, the application allows collaboration in that more than one person can work on "the same page" at the same time. These are but examples of additional features of an illustrative note-taking application. The scope of the present invention is not limited to a system that includes an exact combination or configuration of features as described herein. Other combinations and configurations of features should also be considered within the scope. For example, while the architecture shown in FIG. 1 shows only one database 104, those skilled in the art will appreciate that there might actually be many databases distributed in what might even be a relatively complex data storage configuration.

As is reflected in FIG. 1, it is common for users of a note-taking application to interact with the application utilizing more than one computing device. As the popularity of mobile devices continues to increase, it is likely to become even more common for users to access and utilize such an application from any or all of their various mobile, client, browser and other device interfaces. It is therefore desirable for the note-taking application to support a user experience that is as consistent as possible from one device to the next. In another words, it is probably not a good strategy to assume that users 110-118 are likely to always or even most often use a single device (e.g., a single PC or a single mobile device) when interacting with the application. This being the case, an ideal application design will enable users 110-118 to manage data in storage area 106 in a consistent manner from one use session to the next regardless of whether they are interacting from their primary computing devices 120-128, their alternate computing devices 130-138, or some other computing device.

A logical place to start in terms of maintaining a consistent user experience across multiple devices is to configure the application system to provide users with access to content in a generally device independent manner. For example, if user 110 utilizes device 120 to make a change to the content of a note, the user will ideally see that change made when he or she later accesses the same note utilizing device 130. Or, if user 116 utilizes device 126 to make a change to the content of a note to which user 120 has access, user 120 will ideally see that change regardless of which device he or she uses to retrieve the note. It is not ideal for a user to be forced to deal with the potential inconveniences of device dependence when it comes to content changes and additions.

Thus, in one embodiment, some or all of the content of the note-taking application is maintained in a centrally accessible storage location such that additions, changes and deletions pertinent to the centrally stored content data are made available to users in a generally device independent manner. For example, by storing a latest version of application content in database 106, it becomes possible to provide that version of the content to essentially any device. In essence, modifications or additions to content are made to roam so as to be apparent regardless of being accessed from one particular device or another. All of this assumes, of course, enforcement of content access restrictions as appropriate in light of applicable application access policies, if any (e.g., user-initiated and/or automatically applied content sharing restrictions, etc.).

Those skilled in the art will appreciate that the term "database," as used herein should not be strictly construed. For example "database 106" is really more broadly a "data store." This is because the scope of the present invention should be interpreted so as to extend to a non-database implementation for the content data store (local or server) components described herein.

In another aspect of the present invention, content changes and additions are not the only aspects of the note-taking application to be configured to roam in a device independent manner as described. Device-to-device application consistency is illustratively also supported for application configuration variables and settings, such as but not necessarily limited to user-selected application configuration variables and settings. For example, if user 110 utilizes device 120 to cause a change to an application configuration variable or setting, the user will ideally again see the impact of that change when he or she later interacts similar with the application utilizing device 130. Or, if user 116 utilizes device 126 to cause a change to an application configuration variable setting in a manner that affects the application experience of user 120, user 120 may ideally again see the impact of that change regardless of which device he or she uses to interact with the application. As will become apparent, this roaming of application configuration variables and settings furthers the goal of supporting access source flexibility while minimizing the negative impact of such flexibility on the consistency of the user experience.

Figure 2:
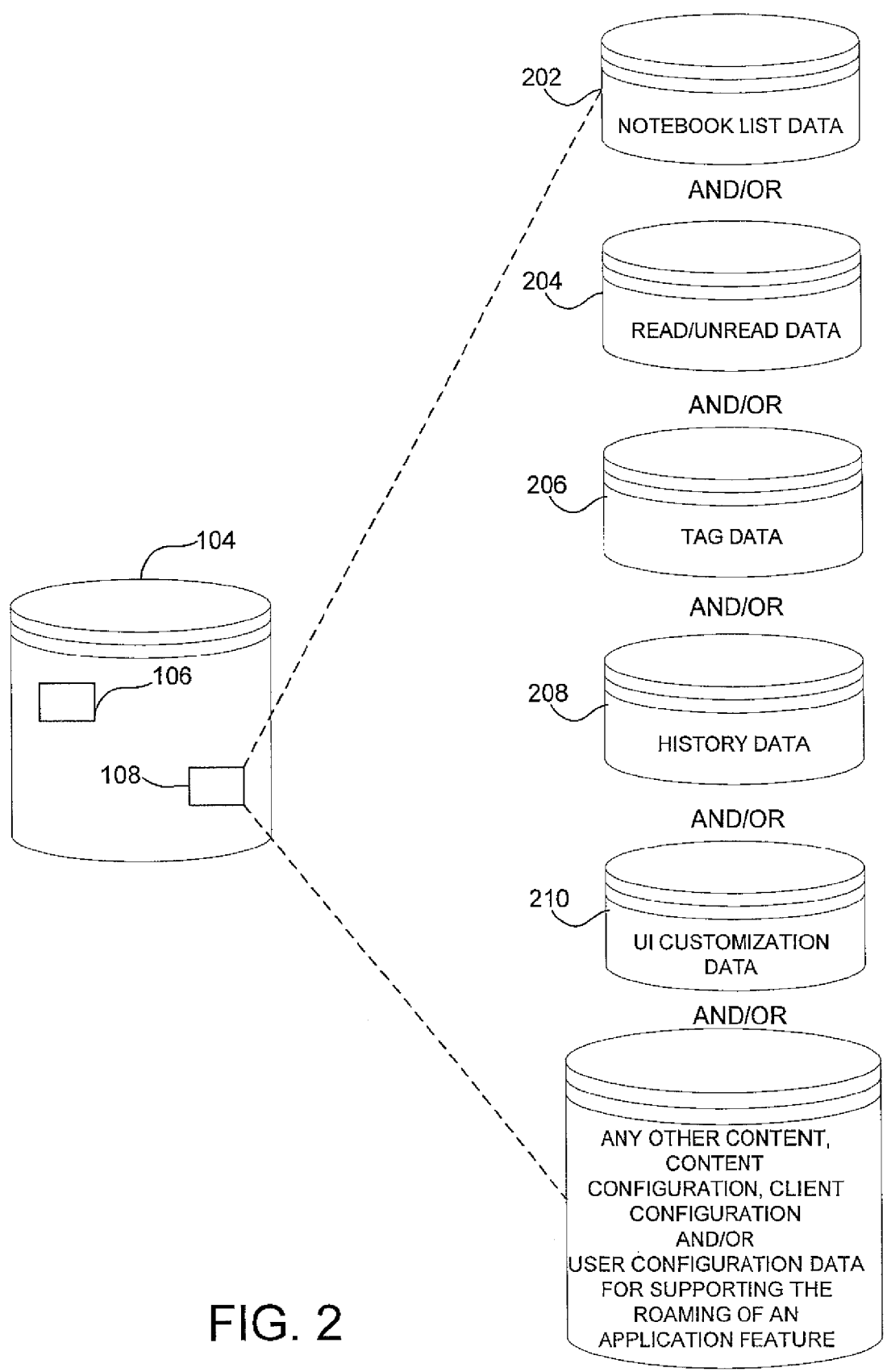
FIG. 2 is a schematic diagram of a centralized database that is part of the note-taking application architecture.

With this in mind, FIG. 2 is a more detailed schematic diagram of the centralized database 104 shown in the application architecture 100 of FIG. 1. Included in database 104 is a collection of application data 108 that is a record of user-selected (and/or automatically or semi-automatically selected) application configuration variables and settings. Application data 108 is maintained in database 104 and utilized as necessary to support, when it is logical to do so, device-to-device consistency in terms of application functions associated with the configuration variables and settings.

It is within the scope of the present invention to configure the note-taking application to support the roaming of any client data, user data and/or content specific data as necessary to support a flexible access model as has been described. However, certain embodiments of the present invention pertain to specific types of application configuration variables and settings.

For example, in one specific embodiment, database area 108 includes a collection of notebook list data 202. In one embodiment, this centrally stored data 202 is utilized to support continuity of the user experience in terms of functionality related to maintaining a record of notebook management variables and settings, including but not necessarily limited to a record of creation, deletion, and, reorganization, or other manipulations of notebooks and/or notebook components (e.g., notebook pages, notes, etc.). In one example manifestation of this functionality, when a new notebook is created as the result of user-initiated application interaction during a first use session of use conducted using a first computing device, information is stored in database area 202 and later referenced in order to support an indication of the new notebook within the application during a subsequent second user session conducted using a different computing device.

In another example, this time described in relation to FIG. 1, when user 112 utilizes device 122 to create, modify, or delete a notebook or notebook component, a record of the result of that activity is stored in database area 202. This record is later retrieved and utilized as a basis for providing an indication of the result within the application when user 112 utilizes alternative device 132 to access to the application. The application user interface presented on device 132 is essentially updated to reflect the result as if device 132 were the source of the notebook modification event that triggered the result, even though a different device was the actual source of the notebook modification event. Those skilled in the art will appreciate how this scheme can easily be extended to a multiple user scenario wherein a first user uses a first device to trigger the result, and a second user sees an indication of the result regardless of which device is utilized by the second user to access the application. This assumes, of course, that the first and second users are linked together within the application in such a way that it is appropriate (e.g., consistent with system access restrictions, etc.) to share notebook interactions.

Those skilled in the art will appreciate the concept of a read/unread indication, such is sometimes utilized within a user interface of an email application to indicate whether a particular email has or has not previously been opened. A similar scheme is illustratively utilized within the note-taking application to indicate whether a given notebook or notebook component (e.g., but not by limitation, a given notebook page or individual note) has or has not been previously viewed. In another embodiment of the present invention, database area 108 includes a collection of read/unread indication data 204 that is utilized to support implementation of read/unread functionality that maintains logical continuity across multiple application access sessions originating from multiple devices. For example, when user 114 utilizes device 124 to mark a notebook component as read or unread, this marking will illustratively transfer and still be reflected in the note-taking application regardless of whether the user 114 utilizes device 124 again or subsequently utilizes device 134 to access the content 106. Those skilled in the art will appreciate how this scheme can easily be extended to other scenarios such as a multiple user scenario. The described read/unread functionality is especially practical when multiple users are updating the same content. This is in contrast to a single user scenario such as a single user notebook. On the other hand, a single user may desire to make content items as unread as a way of flagging them for subsequent re-review.

The note-taking application is illustratively configured to enable a user to selectively associate tags with notes and/or other application objects, and then to search for or group components on a tag specific basis. For example, a user can illustratively add a follow-up or reminder tag to an important note. In one embodiment, the application is provided to the end consumer with several predefined default tags, such as but not limited to, an "important" tag and a "to-do" tag that can be selectively associated by an application user with notes or other application components or objects. In another embodiment; however, the application enables users to create their own custom tags, the customized tags operating similar to the default tags but having a user-selected purpose beyond the scope of the default tags provided with the application.

In another embodiment of the present invention, database area 108 includes a collection of custom tag data 206 that is utilized to support implementation of tag the functions so as to maintain logical continuity across multiple application access sessions originating from multiple devices. For example, when user 114 utilizes device 124 to create a new custom tag, that new tag will illustratively become an available tagging option within the application for that user regardless of whether the user 114 utilizes device 124 again or subsequently utilizes a different device (e.g., device 134) to interact with the application. Those skilled in the art will appreciate how this scheme can easily be extended to a multiple user scenario wherein a first user uses a first device to create a new custom tag, and a second user sees the new tag as an available option regardless of the device utilized by the second user to access the application. This assumes, of course, that the first and second users are linked together within the application in such a way that it is appropriate (e.g., consistent with system access restrictions, etc.) to share tag information.

Other embodiments of the present invention pertain to utilizing database area 206 to support a similar scheme for flexibly providing other information about tags within the note-taking application. In one embodiment, data area 206 also includes a record of tag deletions and/or modifications, and the system similarly supports the roaming of tag data from device-to-device so as to account for the deletions and/or modifications. In another embodiment, data area 206 also includes a record of the application and removal of tags, and the system supports the roaming of that tag data too, for example such that a user that applies a particular tag to a particular note utilizing a first device may reasonably expect the particular note to surface when a search is subsequently conducted based on the particular tag utilizing a second device. These are but examples within the scope of the present invention of how tag data is utilized to support a consistent user experience.

The note-taking application illustratively includes a history function that enables users to access earlier versions of note-taking pages and/or to directly navigate to a recently visited page by selecting a page from a list of recently visited pages. In another embodiment of the present invention, database area 108 includes a collection of history data 208 that is utilized to support implementation the history retrieval and navigation functions so as to maintain logical continuity across multiple application access sessions originating from multiple devices. For example, when user 114 utilizes device 124 to edit a version of a page within the note-taking application, an option to access that version of the page is subsequently made available to the user 124 regardless of whether the user 114 utilizes device 124 again or utilizes a different device (e.g., device 134) to interact with the application. Similarly, when user 114 utilizes device 124 to navigate to a particular page within the note-taking application, the visit to that page is illustratively included in a history listing of recently viewed pages regardless of whether the history listing is brought up by the user 114 utilizing device 124 again or utilizing a different device (e.g., device 134) to interact with the application. Those skilled in the art will appreciate how this scheme can easily be extended to a multiple user scenario wherein a first user uses a first device to create a record of an older version of a page or an entry into a history listing of previously viewed pages, and a second user is provided with access to the older version or history listing regardless of the device utilized by the second user to access the application. This assumes, of course, that the first and second users are linked together within the application in such a way that it is appropriate (e.g., consistent with system access restrictions, etc.) to share historical page information.

The note-taking application illustratively includes configurable options that enable a user to selectively customize how the user interfaces of the application are presented. For example, but certainly not by limitation, the user can illustratively configure the application to always show or hide a Ribbon listing of tools and commands available to the user for selection when interacting with the application. In another example, the user is provided with the option to selectively personalize how and/or which tools and commands are presented in the Ribbon. In another example, the user is provided with the option to selectively create custom tabs and groups that act as shortcuts to most frequently used commands or tools. In another example, the user if provided with the option to have the state of a multi-state data structure maintain consistency from one device to another, for example, a drop menu placed in an expanded state will illustratively maintain the expanded state when the menu is accessed on a different device. These are but several of many of the possibilities for customizable user interface features. In one embodiment, these types of configurable options are provided and implemented in a customized manner based at least in part on the applicable device form factor or operation environment (e.g., different appropriate options for different application environments, large screen, medium size screen, small screen, etc.). Thus, certain options (such as window sizes) will not always be unilaterally shared across all devices, but instead only shared when it makes practical sense to do so in light of the circumstances.

In another embodiment of the present invention, database area 108 includes a collection of history data 210 that is utilized to support implementation the customizable user interface functionality so as to maintain logical continuity across multiple application access sessions originating from multiple devices. For example, when user 114 utilizes device 124 to customize an interface of the note-taking application, the same customization will subsequently be made to the application regardless of whether the user 114 utilizes device 124 again to access the application or utilizes a different device (e.g., device 134) to do so. Those skilled in the art will appreciate how this scheme can easily be extended to a multiple user scenario wherein a first user uses a first device to customize a user interface, and then a second user will experience the same customization regardless of the device utilized by the second user to access the application. This assumes, of course, that the first and second users are linked together within the application in such a way that it is appropriate (e.g., consistent with system access restrictions, etc.) to share user interface customizations.

Figure 3:
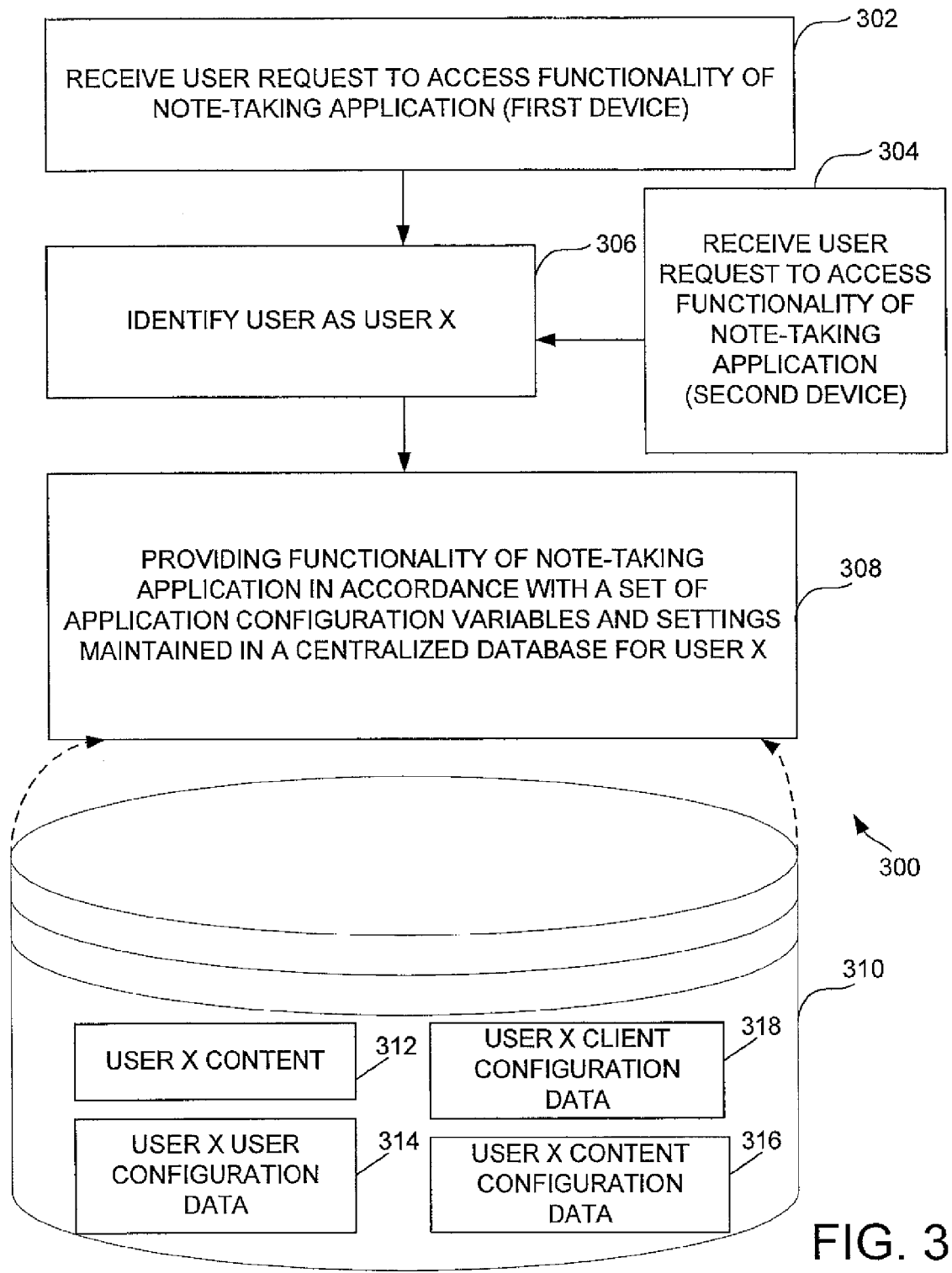
FIG. 3 is a schematic block flow diagram demonstrating a method for providing note-taking application functionality.

FIG. 3 is a schematic block flow diagram 300 demonstrating, in accordance with one aspect of the present invention, a method for providing note-taking application functionality to a user so as to maintain a relatively consistent user experience across multiple devices. Block 302 represents receipt (e.g., receipt by an application) of a first request to access functionality of a note-taking application, the first request originating from a first device. Block 304 represents receipt (e.g., receipt by an application) of a different request to access functionality of the note-taking application, the different request originating from a second device that is different than the first device. As is indicated by block 306, both requests are handled in the same way in that the next step is to identify the user (for the purpose of the diagram, the user is identified as being "user x"). It is to be understood that user identification is to be broadly interpreted. For example, it could mean identifying a role, organization, or any other identifying factor upon which it may be desirable to subsequently decide, on a software programmatic basis involving an execution of instructions, to deliver or not deliver certain application functions.

The next step in method 300, following identification of the user, is represented by box 308 and involves providing functionality of the application to the requesting user so as to e consistent with application configuration variables and settings maintained in a centralized database. In one embodiment, this means providing a function to user x while the user is using the first device despite the fact the function is adjusted so as to be consistent with a variable set by the user while utilizing the second device. In another embodiment, this means providing a function to user x while the user is using the second device despite the fact the function is adjusted so as to be consistent with a variable set by the user while utilizing the first device. Because the application configuration variables and settings are centrally stored, they can be applied regardless of the computing device to which application functionality is being provided.

In one embodiment, the actual application functionality originates primarily from application code stored on the accessing device itself. In this case, the information from the centralized database is provided to the device and utilized as a basis for altering how the application functionality is delivered. However, in another embodiment, the actual application functionality is remotely provided to the accessing device in a manner that accounts for the information in the centralized database. Those skilled in the art will appreciate that there are also combinations of these two scenarios that should be considered within the scope of the present invention, such as a scenario wherein application functionality is divided between local and remotely provided functions. In one embodiment, application functionality is remotely provided through another application operating on the client device such as an Internet browser. All of these and other functionally similar options for delivering application functionality in accordance with information included in a centralized database should be considered within the scope of the present invention.

FIG. 3 includes a depiction of the centralized database (i.e. database 310) that includes the application configuration variables and settings. It is to be understood that database 310 can be configured to support the provision of any of the note-taking functions as shown and described in relation to FIG. 2. However, database 310 is depicted as including support for roaming customization of a more broadly characterized collection of user content data 312 (i.e., the actual content), user configuration data 314, content configuration data 316 (i.e., data related to how content is organized, etc.), and client configuration data 318.

It is within the scope of the present invention to utilize database area 318 to store a record of any client configuration data and then support the step roaming of that data from device-to-device as necessary to support a logically consistent user experience similar to what the user would expect from one user session to the next if they were using a single particular device to repeatedly access an application stored on the particular device. This roaming client configuration data may include any client customizations or settings. Such customizations and settings may include, but not by limitation, variables that adjust the client color, Ribbon presentation settings, organization of options in the file menu, etc.

It is within the scope of the present invention to utilize database area 314 to store a record of any user configuration data and then support the roaming of that data from device-to-device as necessary to support a logically consistent user experience similar to what the user would expect from one user session to the next if they were using a single particular device to repeatedly access an application stored on the particular device. This roaming user configuration data may include any user customizations or settings. Such customizations and settings may include, but not by limitation, variables that adjust the names, initials, pictures, customized tags, words in a dictionary, preferred font, etc.

It is within the scope of the present invention to utilize database area 316 to store a record of any content-related configuration data and then support the roaming of that data from device-to-device as necessary to support a logically consistent user experience similar to what the user would expect from one user session to the next if they were using a single particular device to repeatedly access an application stored on the particular device. This roaming content-related configuration data may include any content customizations or settings. Such customizations and settings may include, but not by limitation, variables that adjust the expansion/collapse of sub-pages, presentation and organization of content preferences, etc.

An example scenario will shine some additional light on how embodiments of the present invention are likely to be perceived from the perspective of a user. In accordance with the scenario, an illustrative user has a smartphone, a laptop, and occasionally uses public computers. The user utilizes the note-taking application from all three computing device sources. Embodiments of the present invention enable a relatively or completely consistent application experience for the user regardless of which device is utilized. Regardless of which device the user chooses to access the application, it easy to keep the same set of notebooks open. It is easy to sync read/unread state indications across the computing devices. It is worth investing time to create a custom tag scheme because it is easily applied across the computing devices. It is also easy to apply user interface customizations automatically across all devices where the same user interface is made available within the application framework. It is even very easy for the user to transition work across locations because the application applied embodiments similar to those described herein to notate in a centralized data storage location. For example, the user can use the application to edit a shopping list on his/her laptop, and then start up the application on his/her phone when he gets to the store, which will illustratively cause an automatic presentation of the page he was just editing on his laptop. These are but examples of benefits experienced by a user in accordance with embodiments of the present invention.

Figure 4:
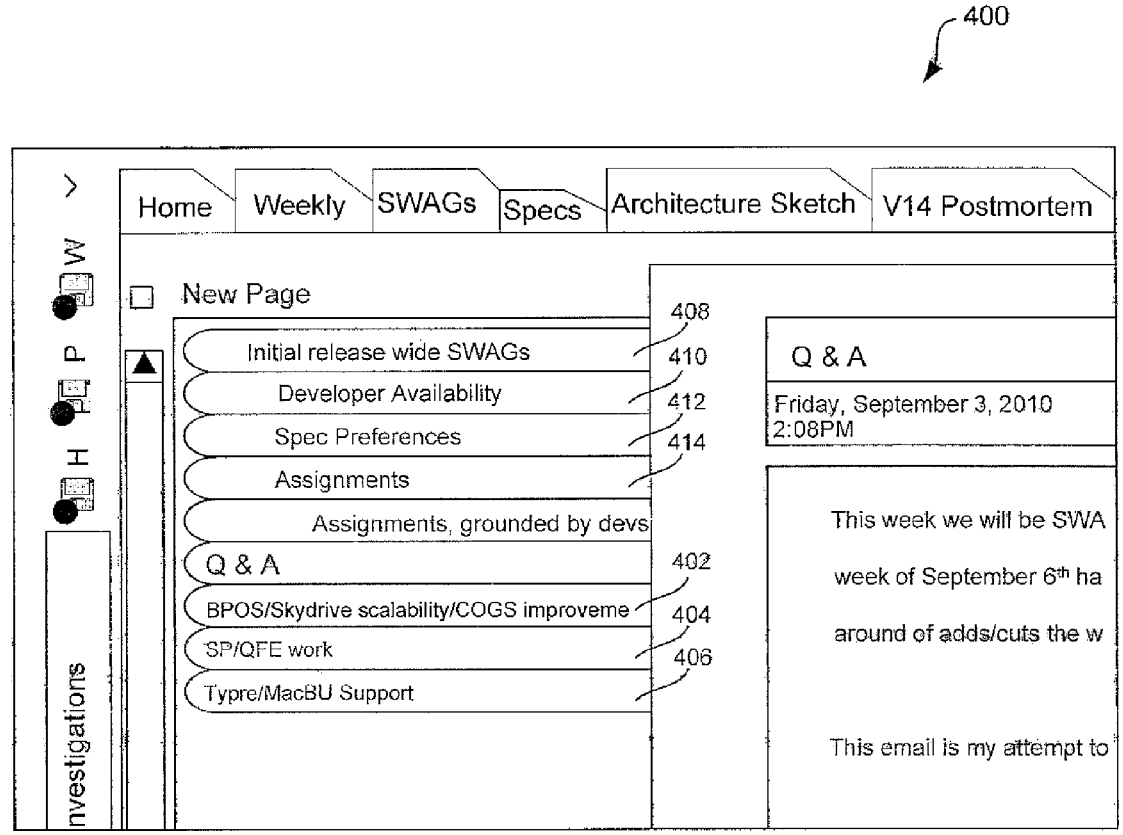
FIG. 4 is an example screenshot of an exemplary note-taking application.

FIG. 4 is an example screenshot 400 of an exemplary note-taking application. Within screenshot 400 tabs 402-408 are more darkly colored, as compared to tabs 410-414. The coloring of tabs 402-408 illustratively is an indicator that these tabs are associated with the fact that there has not yet been review of changes to an associated collection of content, for example a collection of content that another person (e.g., a person with whom the user associated with screenshot 410 is collaborating with in terms of sharing access to a notebook) has changed. The coloring of the more lightly colored tabs 410-414 illustratively indicate association with content that has not been changed and therefore may not require the user's immediate attention. This highlighting scheme enables the user to easily identify where to find new/changed collections of content.

In accordance with embodiments of the present invention, this highlighting scheme is applied on a device independent basis. For example, collections of content whose indicators are transferred from unread to read on one computing device will, thanks to the centralized storage and application of configuration variables and settings, also show up on any of the users other computing device's utilized to access the note-taking application. This is but one example of a read/unread scenario within the scope of the present invention.

Figure 5:
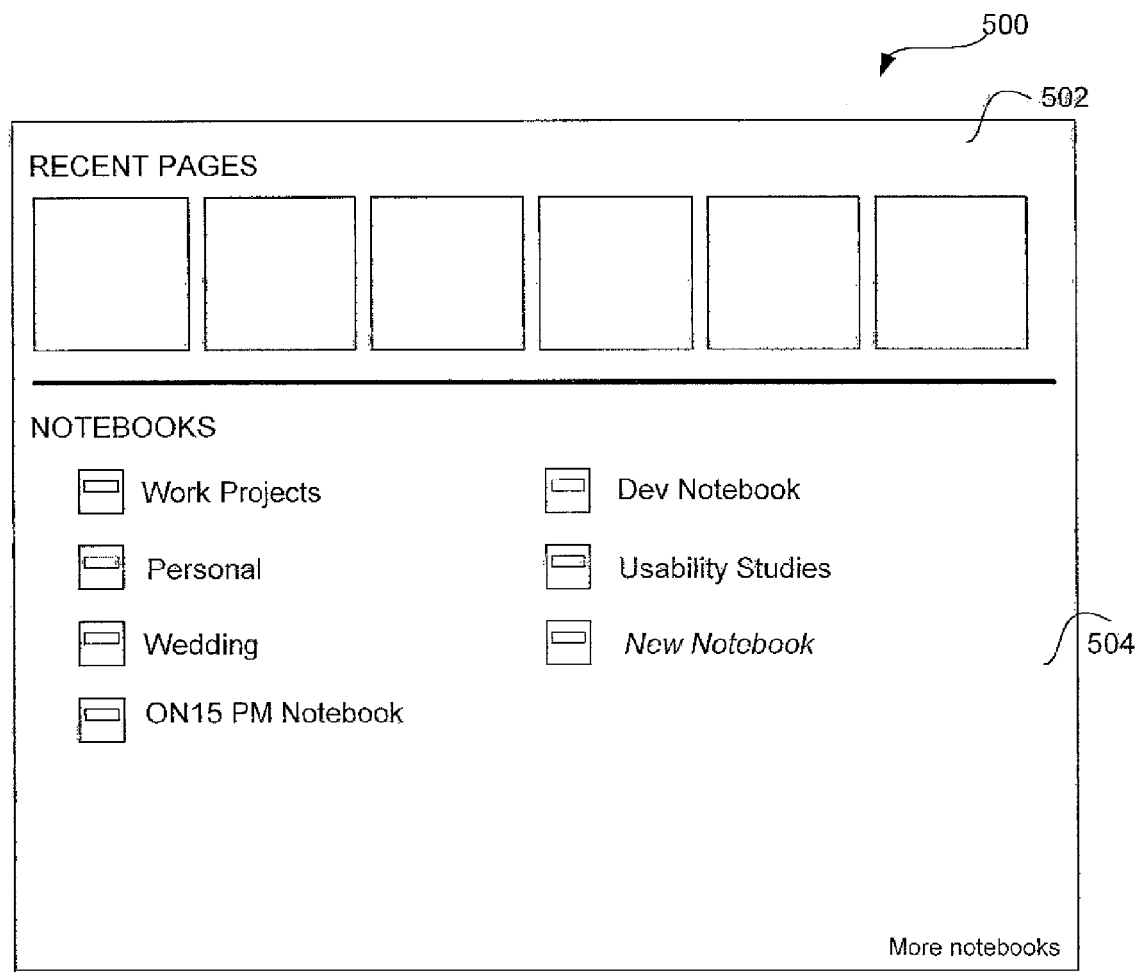
FIG. 5 is an example screenshot of an exemplary note-taking application.

FIG. 5 is an example screenshot 500 of an exemplary note-taking application. The screenshot includes an area 502 that presents a listing of notebook pages the user has visited recently. An area 504 presents a listing of notebooks to which the user has access. In accordance with embodiments of the present invention, the listing in areas 502 and 504 are applied on a device independent basis. For example, a notebook will appear in area 504, and a page will appear in area 502, regardless of the activity that triggered inclusion in each of the listings occurred on the device utilized to access screenshot 500 or a different device. This is possible due to the centralized storage and application of configuration variables and settings described herein. These are but examples of notebook and page listings within the scope of the present invention.

Figure 6:
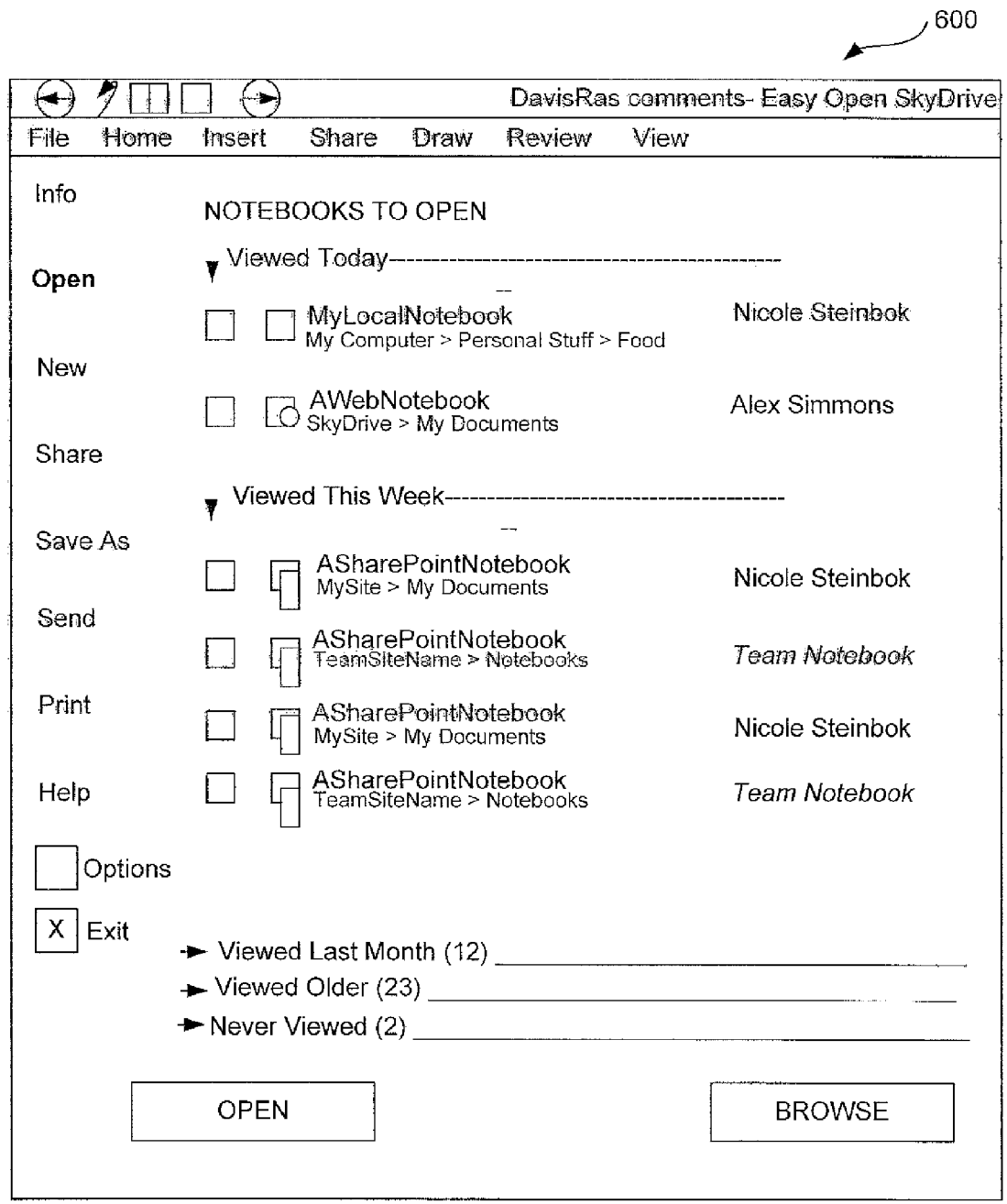
FIG. 6 is an example screenshot of an exemplary note-taking application.

FIG. 6 is an example screenshot 600 of an exemplary note-taking application. This screenshot includes a presentation of notebooks which the user has recently accessed. In accordance with embodiments of the present invention, the listing is applied on a device independent basis. For example, a notebook will appear regardless of the activity that triggered inclusion in the listing occurred on the device utilized to access screenshot 600 or a different device. This is possible due to the centralized storage and application of configuration variables and settings described herein. This is but another example of a notebook listing within the scope of the present invention.

FIGS. 7-10 show a number of different embodiments for computing devices upon which embodiments of the present invention may be implemented. While these embodiments will be described in FIGS. 7-10, it should be noted that these are not exclusive, but are provided as illustrative and exemplary descriptions of embodiments of devices applicable to embodiments of the present invention.

While systems (e.g., software applications) that implement a note-taking application consistent with embodiments described herein can primarily reside on a client device such as those specifically shown herein, such systems could just as easily be embodied elsewhere, such as in a cloud computing environment, possibly but not necessarily in conjunction with the same environment within which application configuration variables and settings are centrally stored. Cloud computing provides computation, software, data access, and storage services that generally do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the functions described herein can be provided from a service provider at a remote location using a cloud computing architecture. Alternatively, they can be provided from a conventional server, or they can be installed on a client device directly.

Figure 7:
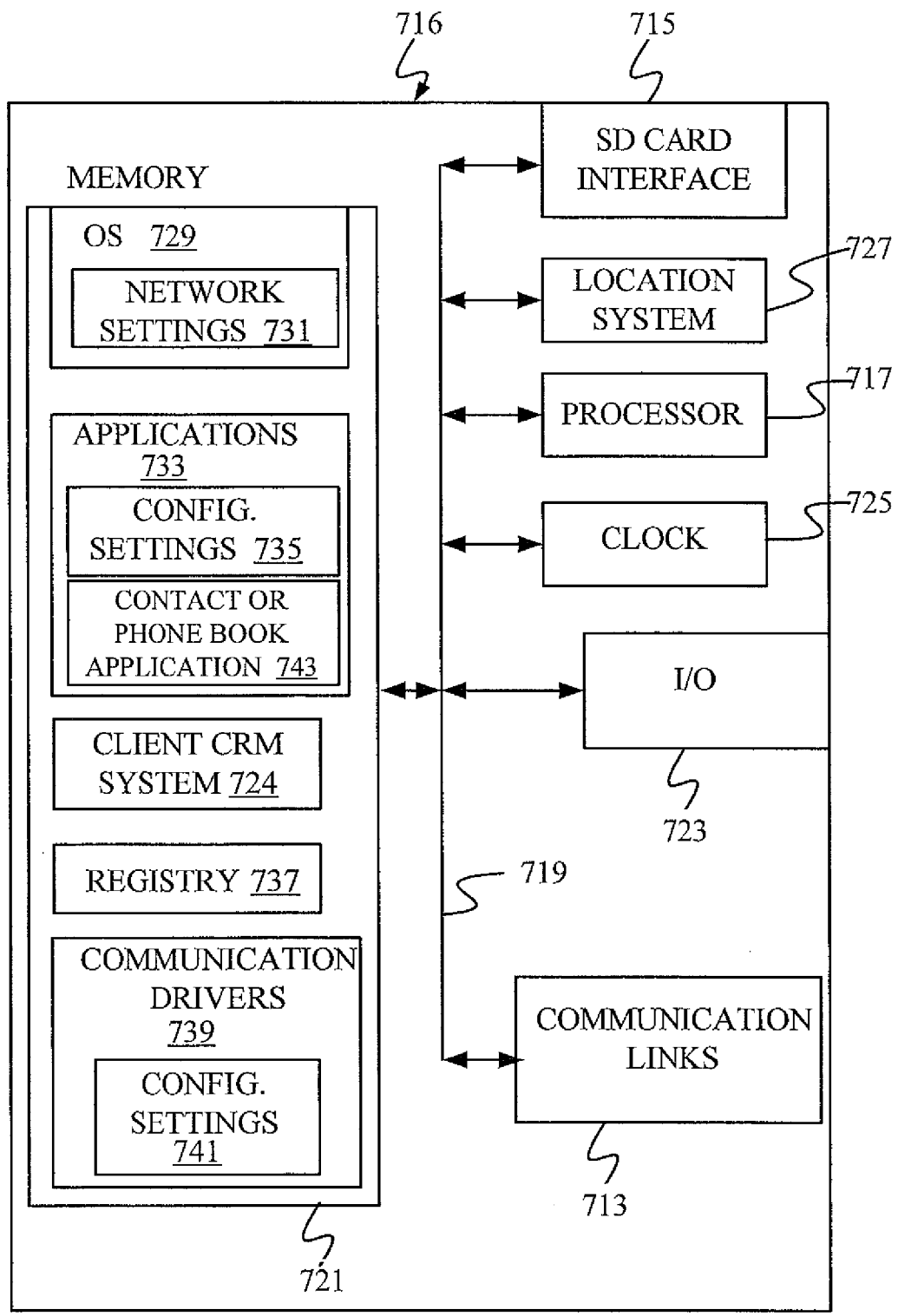
FIG. 7 is a simplified block diagram of a mobile computing device.
Figure 8:
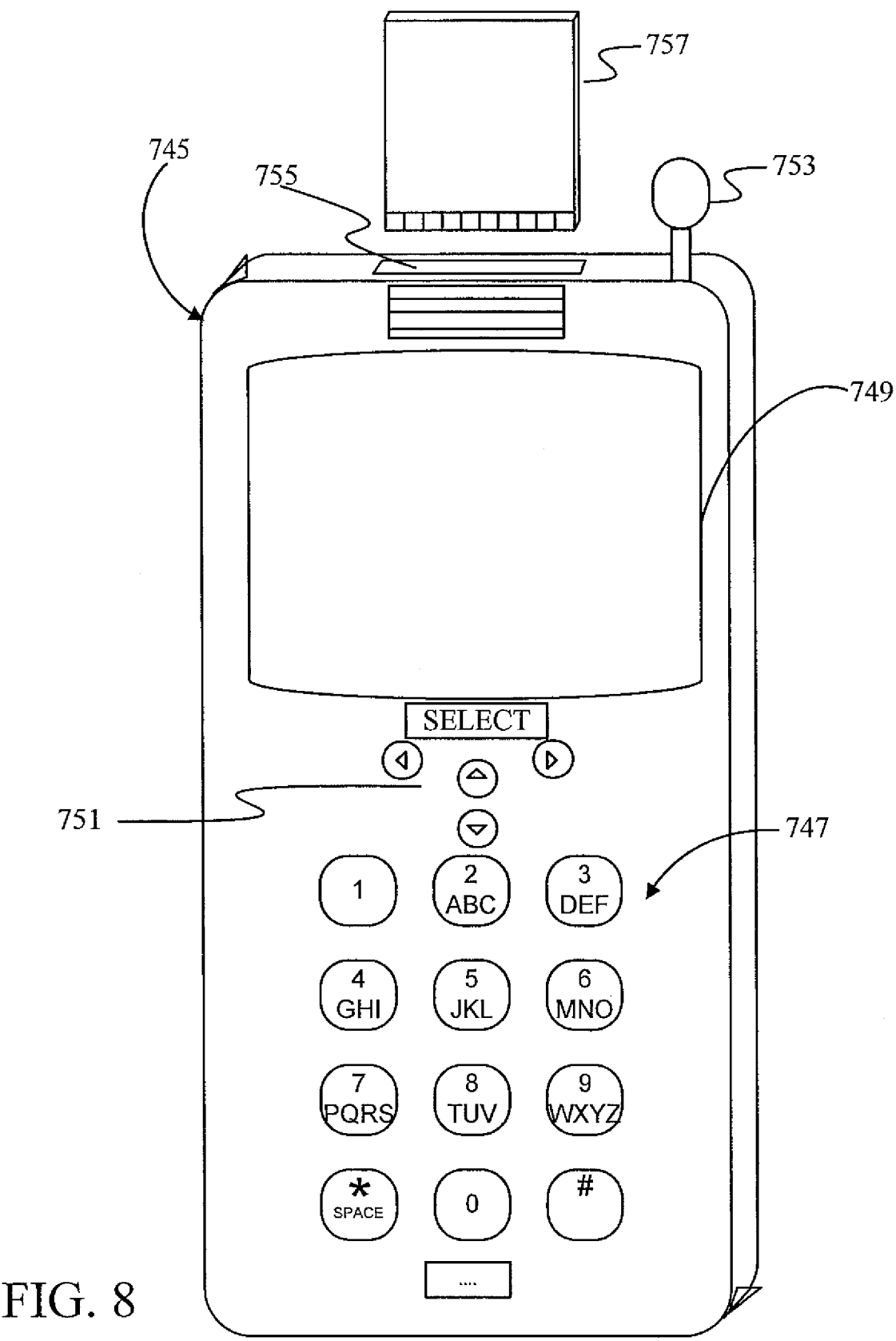
FIG. 8 is a schematic diagram of an example of a smart phone or mobile phone.

In any case, FIG. 7 is a simplified block diagram of one illustrative embodiment of a handheld or mobile computing device that can be used as a client device, upon which systems that implement embodiments of the present invention may be deployed. FIGS. 8 and 7 are examples of handheld or mobile devices.

FIG. 7 provides a general block diagram of the components of a client device. In the device, a communications link 713 is provided that allows the handheld device to communicate with other computing devices and under some embodiments provides a channel for receiving information automatically, such as by scanning. Examples of communications link 713 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 715. SD card interface 715 and communication links 713 communicate with a processor 717 along a bus 719 that is also connected to memory 721 and input/output (I/O) components 723, as well as clock 725 and location system 727.

I/O components 723, in one embodiment, are provided to facilitate input and output operations. I/O components 723 for various embodiments of the device can include input components such as buttons, touch sensors, touch screens, proximity sensors, microphones, tilt sensors, and gravity switches and output components such as display device 726, a speaker, and or a printer port. Other I/O components 723 can be used as well.

Clock 725 illustratively comprises a real time clock component that outputs a time and date. It can also, illustratively, provide timing functions for processor 717.

Location system 727 illustratively includes a component that outputs a current geographical location of device 718. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 721 stores operating system 729, network settings 731, applications 733, application configuration settings 735, registry 737, communication drivers 739, and communication configuration settings 741. Memory 721 can include all types of tangible volatile and non-volatile computer-readable memory devices. Memory 721 stores computer readable instructions that, when executed by processor 717, cause the processor to perform computer-implemented steps or functions according to the instructions. Processor 717 can be activated by other components to facilitate their functionality as well.

Examples of the network settings 731 include things such as proxy information, Internet connection information, and mappings. Application configuration settings 735 include settings that tailor the application for a specific enterprise or user. Communication configuration settings 741 provide parameters for communicating with other computers and include items such as GPRS parameters, SMS parameters, connection user names and passwords.

Applications 733 can be applications that have previously been stored on the device 718 or applications that are installed during use. In one embodiment, applications 733 can be part of operating system 729, or hosted external to device 718, as well.

Figure 9:
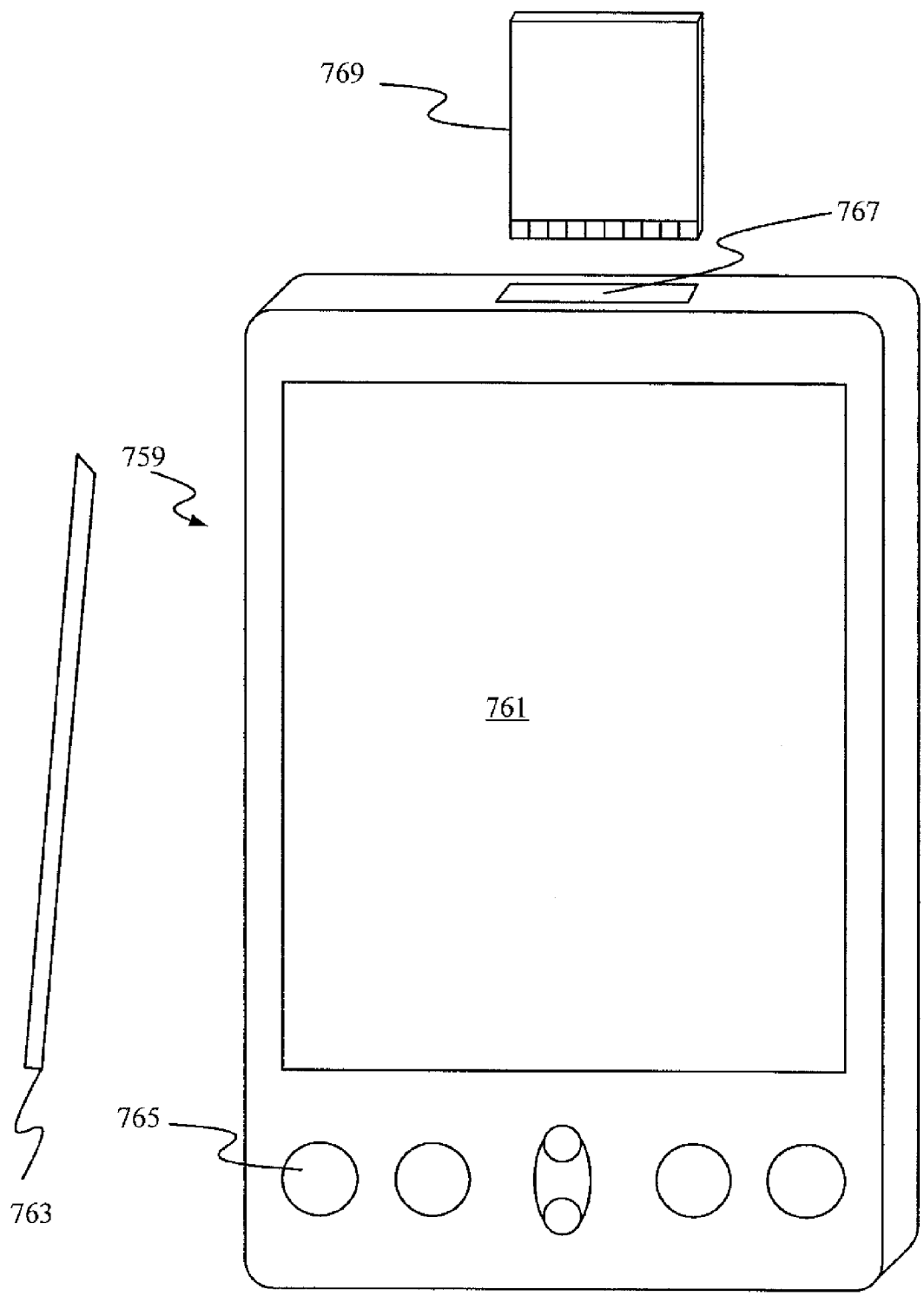
FIG. 9 is a schematic diagram of a personal digital assistant (PDA) or a multimedia player or a slate or tablet computing device.

FIGS. 8 and 9 provide examples of devices 718 that can be used, although others can be used as well. In FIG. 8, a smart phone or mobile phone 745 is provided as the device 718. Phone 745 includes a set of keypads 747 for dialing phone numbers, a display 749 capable of displaying images including application images, icons, web pages, photographs, and video, and control buttons 751 for selecting items shown on the display. The phone includes an antenna 753 for receiving cellular phone signals such as General Packet Radio Service (GPRS) and 1Xrtt, and Short Message Service (SMS) signals. In some embodiments, phone 745 also includes a Secure Digital (SD) card slot 755 that accepts a SD card 757.

The mobile device of FIG. 9 is a personal digital assistant (PDA) 759 or a multimedia player or a slate or tablet computing device, etc. (hereinafter referred to as PDA 759). PDA 759 includes an inductive screen 761 that senses the position of a stylus 763 (or other pointers, such as a user's finger) when the stylus is positioned over the screen. This allows the user to select, highlight, and move items on the screen as well as draw and write. PDA 759 also includes a number of user input keys or buttons (such as button 765) which allow the user to scroll through menu options or other display options which are displayed on display 761, and allow the user to change applications or select user input functions, without contacting display 61. Although not shown, PDA 759 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 759 also includes a SD card slot 767 that accepts a SD card 769.

Note that other forms of the devices 718 are possible. Examples include tablet or slate computing devices, music or video players, and other handheld computing devices.

Figure 10:
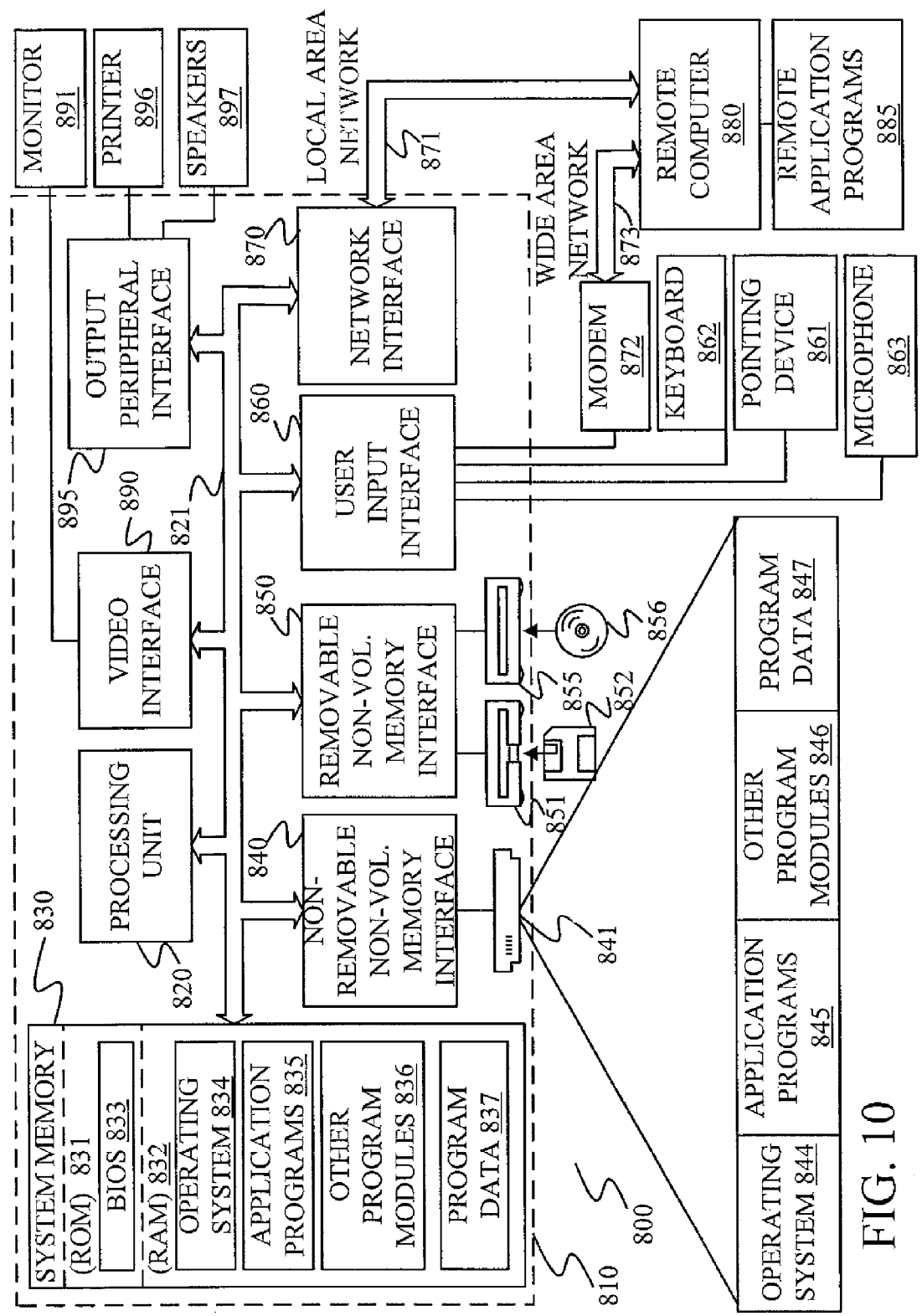
FIG. 10 is a schematic diagram of a computer or a computing device.

FIG. 10 is one embodiment of another computing environment. With reference to FIG. 10, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 10, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. They can also include search components 802 and 804.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 15 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of supporting a roaming note-taking application feature, the method comprising:
   receiving a remotely transmitted notebook management variable from a first user computing device, wherein the remotely transmitted notebook management variable is based on a user interaction with a note-taking application at the first user computer device;
   storing the notebook management variable as a part of a collection of notebook list data; and
   remotely transmitting a record of the notebook management variable to a second user computing device that is different than the first user computing device.

2. The method of claim 1, further comprising storing the notebook management variable in association with a record of a first user.

3. The method of claim 1, wherein the notebook management variable indicates at least one of:
   creation of a notebook or notebook component;
   deletion of a notebook or notebook component;
   modification of a notebook or notebook component; or
   reorganization of a notebook or notebook component.

4. The method of claim 1, wherein the notebook management variable indicates whether a given notebook or notebook component has been previously viewed, and further comprising storing the notebook management variable as part of read/unread data.

5. The method of claim 1, wherein the notebook management variable indicates a custom tag created based on the user interaction, and further comprising storing the notebook management variable as part of a collection of customized tag data.

6. The method of claim 1, wherein the notebook management variable indicates a customization to the user interface relative to how a collection of tools and commands are presented in a user interface of the note-taking application, and further comprising storing the notebook management variable as part of a collection of user interface customization data.

7. The method of claim 1, wherein the notebook management variable relates to a history function of the note-taking application that enables a user to at least one of: access an earlier version of a notebook or notebook component, or to directly navigate to a recently viewed notebook or notebook component, the method further comprising storing the notebook management variable as part of a collection of historical notebook or page navigation data.

8. A computer-implemented method of supporting a roaming note-taking application feature, the method comprising:
customizing a user interface component of a note-taking application, at a user computing device, based on a record of an application configuration variable received by the user computing device from a remote data source over a computer network, wherein customizing the user interface component further comprises including a particular page or notebook in a historical listing of visited pages or notebooks;
receiving a user input that modifies the application configuration variable at the user computing device; and
sending an indication of the modified application configuration variable to the remote data source.

9. The method of claim 8, wherein customizing the user interface component further comprises including a particular notebook in a listing of notebooks.

10. The method of claim 8, wherein customizing the user interface component further comprises including a particular notebook page in a listing of notebook pages.

11. The method of claim 8, wherein customizing the user interface component further comprises marking an item as unread.

12. The method of claim 8, wherein customizing the user interface component further comprises expanding or collapsing an expandable user interface component.

13. A system comprising;
a communication interface configured to communicate with a plurality of computing devices over a computer network, the plurality of computing devices corresponding to a plurality of users; and
one or more data stores configured to store user content data for a note-taking application and to store application data for the note-taking application, wherein the application data comprises a plurality of records of application configuration variables, for the plurality of users, relative to the note-taking application;
wherein the system is configured to:
receive a user request, from a particular one of the users, to access functionality of the note-taking application;
identify the particular user from which the user request is received;
retrieve at least one of the records based on identification of the particular user, the retrieved record comprising an application configuration variable that defines a customization to the note-taking application, the customization comprising at least one of including a particular notebook in a listing of notebooks, including a particular notebook page in a listing of notebook pages, marking an item as unread, including a particular page or notebook in a historical listing of visited pages or notebooks, or modifying an expandable user interface component; and
provide the functionality of the note-taking application to the particular user so as to be consistent with the application configuration variable in the retrieved record.

14. The system of claim 13, wherein the system is configured to provide the functionality by transmitting the application configuration variable in the retrieved record, over the computing network, to the computing device corresponding to the particular user.

15. The system of claim 13, wherein the customization comprises a customization to a user interface component of the note-taking application.

16. The system of claim 13, wherein the communication interface is configured to receive the application configuration variable, that is stored in the retrieved record, from a first one of the computing devices, and to provide the functionality of the note-taking application by sending the application configuration variable to a second one of the computing devices.

17. The system of claim 13, wherein the customization comprises including a particular notebook in a listing of notebooks.

18. The system of claim 13, wherein the customization comprises marking an item as unread.

19. The system of claim 13, wherein the customization comprises including a particular page or notebook in a historical listing of visited pages or notebooks.

20. The system of claim 13, wherein the customization comprises modifying an expandable user interface component.

* * * * *